(12) United States Patent
Olbert et al.

(10) Patent No.: US 9,023,300 B2
(45) Date of Patent: May 5, 2015

(54) REACTOR AND PROCESS FOR PREPARING PHOSGENE

(75) Inventors: Gerhard Olbert, Dossenheim (DE); Wolfgang Gerlinger, Limburgerhof (DE); Byoung-Yeon Kim, Baton Rouge, LA (US)

(73) Assignee: BASF SE, Ludwigshafen (DE)

( * ) Notice: Subject to any disclaimer, the term of this patent is extended or adjusted under 35 U.S.C. 154(b) by 914 days.

(21) Appl. No.: 13/140,227

(22) PCT Filed: Dec. 16, 2009

(86) PCT No.: PCT/EP2009/067238
§ 371 (c)(1),
(2), (4) Date: Jul. 29, 2011

(87) PCT Pub. No.: WO2010/076208
PCT Pub. Date: Jul. 8, 2010

(65) Prior Publication Data
US 2011/0288334 A1    Nov. 24, 2011

(30) Foreign Application Priority Data
Dec. 16, 2008 (EP) .................................. 08171730

(51) Int. Cl.
*B01J 8/06* (2006.01)
*C01B 31/28* (2006.01)

(52) U.S. Cl.
CPC ........ *B01J 8/067* (2013.01); *B01J 2208/00221* (2013.01); *B01J 2208/0023* (2013.01); *B01J 2219/00247* (2013.01); *B01J 2219/0286* (2013.01); *C01B 31/28* (2013.01)

(58) Field of Classification Search
CPC ........................................................ B01J 8/06
USPC ................. 422/198, 200, 201, 650–654, 658
See application file for complete search history.

(56) References Cited

U.S. PATENT DOCUMENTS

| 3,532,160 | A  | * | 10/1970 | Garrison ...................... 165/159 |
| 5,161,605 | A  | * | 11/1992 | Gutlhuber ..................... 165/103 |
| 6,808,689 | B1 |   | 10/2004 | Matsumoto et al. |
| 8,492,587 | B2 | * | 7/2013  | Olbert et al. .................. 562/847 |
| 2004/0126285 | A1 | * | 7/2004 | Olbert et al. .................. 422/130 |
| 2005/0107483 | A1 | * | 5/2005 | Sakakura et al. ............ 518/726 |
| 2005/0118088 | A1 |   | 6/2005 | Olbert et al. |
| 2006/0047170 | A1 |   | 3/2006 | Keggenhoff et al. |
| 2007/0297959 | A1 | * | 12/2007 | Suzuta et al. ................ 422/312 |

FOREIGN PATENT DOCUMENTS

| DE | 10 2004 041777 | 3/2006 |
| EP | 1 080 780 | 3/2001 |
| EP | 1 813 346 | 8/2007 |
| WO | 03 072237 | 9/2003 |

OTHER PUBLICATIONS

U.S. Appl. No. 13/255,665, filed Sep. 9, 2011, Olbert, et al.
U.S. Appl. No. 13/383,549, filed Jan. 11, 2012, Schelling, et al.
Ullmanns Enzyklopädie Der Technischen Chemie, vol. A 19, pp. 413-414, (1991).
International Search Report issued May 4, 2010 in PCT/EP09/067238 filed Dec. 16, 2009.
U.S. Appl. No. 13/140,194, filed Jun. 16, 2011, Olbert, et al.

* cited by examiner

*Primary Examiner* — Walter D Griffin
*Assistant Examiner* — Huy-Tram Nguyen
(74) *Attorney, Agent, or Firm* — Oblon, McClelland, Maier & Neustadt, L.L.P.

(57) ABSTRACT

A reactor (1) for preparing phosgene by gas-phase reaction of carbon monoxide and chlorine in the presence of a solid-state catalyst, which is provided in a plurality of catalyst tubes (2) which are arranged parallel to one another in the longitudinal direction of the reactor (1) and are welded at each of their two ends into a tube plate (3), with introduction of the starting materials at the upper end of the catalyst tubes (2) and discharge of the gaseous reaction mixture at the lower end of the catalyst tubes (2), in each case via a cap, and also with introduction and discharge facilities for a liquid heat transfer medium (7) in the space (4) between the catalyst tubes (2) within the shell, where the flow of the heat transfer medium (7) in the space (4) between the catalyst tubes (2) within the shell is meandering as a result of deflection plates (5), each alternative deflection plate (5) leaves two openings (6) having the shape of a segment of a circle free on opposite sides at the interior wall of the reactor and the immediately subsequent deflection plate leaves a central opening (11) which is bounded by two straight lines which are parallel to and equidistant from one another and a reactor diameter free and the reactor (1) has no tubes in the region of the openings (6) having the shape of a segment of a circle and in the region of the central openings (11), wherein the many catalyst tubes (2) aligned parallel to one another in the longitudinal direction of the reactor (1) are arranged in two bundles of identical catalyst tubes (2) which are separated from one another by a region which is free of catalyst tubes (2) and extends to both sides along a reactor diameter and the heat transfer coefficients at the interface between the catalyst tubes (2) and the heat transfer medium (7) are equalized over each reactor cross section by the flow paths of the heat transfer medium (7) in each reactor cross section, in each case measured from the first to last catalyst tube (2) in the flow direction of the heat transfer medium (7), being matched to one another by means of an altered arrangement of the catalyst tubes (2), is proposed.

7 Claims, 4 Drawing Sheets

REACTOR AND PROCESS FOR PREPARING PHOSGENE

The invention relates to a reactor and a process for preparing phosgene by gas-phase reaction of carbon monoxide and chlorine in the presence of a solid-state catalyst.

Phosgene is prepared industrially in a catalytic gas-phase reaction of carbon monoxide and chlorine in the presence of a solid-state catalyst, preferably activated carbon. The reaction is strongly exothermic; the formation enthalpy is −107.6 kJ/mol. The reaction is generally carried out in a shell-and-tube reactor using the process described in Ullmanns Enzyklopädie der technischen Chemie, vol. A 19, pages 413 to 414. According to this reference, the particulate catalyst having a particle size in the range from 3 to 5 mm is used in tubes having an internal diameter of from 50 to 70 mm. The reaction commences at from 40 to 50° C., the temperature in the tubes increases to about 580° C. and then drops again. Carbon monoxide is used in a small excess in order to ensure that all the chlorine is reacted and chlorine-free phosgene is obtained. The reaction can be carried out at atmospheric pressure or under superatmospheric pressure, frequently at from 2 to 5 bar in order to be able to condense the phosgene by means of cooling water.

Phosgene is an important auxiliary in the preparation of intermediates and end products in virtually all branches of chemistry. The largest field of use in terms of quantity is the preparation of diisocyanates for polyurethane chemistry, in particular tolylene diisocyanate and 4,4-diisocyanatodiphenylmethane.

To achieve better removal of the heat of reaction via the heat transfer medium circulating between the catalyst tubes, deflection plates are installed between the catalyst tubes in order to induce the heat transfer medium to flow transversely onto the catalyst tubes.

Known shell-and-tube reactors for the preparation of phosgene have a full complement of tubes in order to achieve maximum exploitation of the space in the interior of the reactor. Between the catalyst tubes, they have deflection plates which are kept relatively short, i.e. they do not extend to the interior wall of the reactor in the deflection region but instead leave a proportion of from about 25 to 30% of the total reactor cross section free in order to limit the pressure drop experienced by the heat transfer medium and thus the operating costs for the circulation pump for the heat transfer medium. In the deflection region, the flow profile of the heat transfer medium around the catalyst tubes changes from transverse flow onto the tubes to longitudinal flow along the tubes. The catalyst tubes are cooled less effectively, as a consequence of which corrosion problems occur on the catalyst tubes in the deflection region.

WO 03/072237 describes an improved reactor for preparing phosgene, which makes an increased specific cross-sectional loading and thus a higher capacity possible by avoiding the corrosion problems on the catalyst tubes in the deflection region. For this purpose, WO 03/072237 proposes a reactor having a bundle of catalyst tubes which are arranged parallel to one another in the longitudinal direction of the reactor and are fixed at their ends in tube plates, with a cap at each of the two ends of the reactor and deflection plates which are arranged perpendicular to the longitudinal direction of the reactor in the intermediate space between the catalyst tubes and leave openings free on alternating opposite sides of the interior wall of the reactor, with the catalyst tubes being filled with the solid-state catalyst, the gaseous reaction mixture being passed through the catalyst tubes from one end of the reactor via a cap and being taken off from the opposite end of the reactor via the second cap and a liquid heat transfer medium being passed through the intermediate space around the catalyst tubes and the reactor having no tubes in the region of the openings.

However, it has been found in the case of reactors having a relatively large diameter, in particular from reactor diameters of about 3.50 m upward, that the pressure drop experienced by the heat transfer medium flowing through the space within the shell over the reactor cross section from one opening at the interior wall of the reactor to the opposite opening at the interior wall of the reactor becomes too great as the reactor diameter increases. Furthermore, the losses of heat transfer medium and thus the pressure drop over the gap between the outer wall of the catalyst tubes and the deflection plates which is present for manufacturing reasons also become too great. Correspondingly, the outlay for the pump for the heat transfer medium becomes too great.

In addition, the large pressure drop over the reactor cross section between the two opposite openings at the interior wall of the reactor leads to larger differences in the heat transfer coefficients at the interface between the catalyst tubes and the heat transfer medium, as a result of which factors of 1:2 can occur between regions having good heat transfer and regions having poor heat transfer within a reactor cross section. As a result, the catalyst tubes in the regions having poor heat transfer are cooled less well. However, since the catalyst tubes have, depending on the material used, in particular duplex steel, a maximum operating temperature, frequently in the range from about 160 to 200° C., in particular from 170 to 180° C., which must not be exceeded because otherwise the corrosion of the material increases greatly, the regions having poor heat transfer limit the throughput and thus the capacity of the reactor.

In the case of phosgene reactors having very large diameters, from 2.5 m up to diameters of 6 m, the loss of heat transfer medium and the pressure drop due to bypass flows through the gap between the deflection plates and the catalyst tubes frequently become so great that flow around the interior tubes in the central region of the reactor is no longer sufficient and these tubes are therefore no longer cooled sufficiently and are therefore at risk of corrosion.

It was therefore an object of the invention to provide a process for preparing phosgene on an industrial scale and a reactor which can be operated at a high phosgene loading and nevertheless ensures sufficient cooling, even of the catalyst tubes in the central region of the reactor.

The object is achieved by a reactor for preparing phosgene by gas-phase reaction of carbon monoxide and chlorine in the presence of a solid-state catalyst, which is provided in a plurality of catalyst tubes which are arranged parallel to one another in the longitudinal direction of the reactor and are welded at each of their two ends into a tube plate, with introduction of the starting materials at the upper end of the catalyst tubes and discharge of the gaseous reaction mixture at the lower end of the catalyst tubes, in each case via a cap, and also with introduction and discharge facilities for a liquid heat transfer medium in the space between the catalyst tubes within the shell, where the flow of the heat transfer medium in the space between the catalyst tubes within the shell is meandering as a result of deflection plates, each alternative deflection plate leaves two openings having the shape of a segment of a circle free on opposite sides at the interior wall of the reactor and the immediately subsequent deflection plate leaves a central opening which is bounded by two straight lines which are parallel to and equidistant from one another and a reactor diameter free and the reactor has no tubes in the region of the openings having the shape of a segment of a circle and in the region of the central openings, wherein the many catalyst tubes aligned parallel to one another in the longitudinal direction of the reactor are arranged in two bundles of identical catalyst tubes which are separated from one another by a region which is free of catalyst tubes and extends to both sides along a reactor diameter and the heat transfer coefficients at the interface between the catalyst tubes and the heat transfer medium are equalized over each reactor cross section by the flow paths of the heat transfer medium in each reactor cross section, in each case measured from the first to last catalyst tube in the flow direction of the heat transfer medium, being matched to one another by means of an altered arrangement of the catalyst tubes.

In a preferred embodiment, the two bundles of identical catalyst tubes are each divided into two further bundles of identical catalyst tubes, so that there are a total of four bundles of catalyst tubes which are separated from one another by two regions which are free of catalyst tubes and extend on both sides of mutually perpendicular diameters of the reactor. Here, the geometry of the deflection plates is preferably matched to the geometry of the tube plane, i.e. the arrangement of the catalyst tubes over the reactor cross section. The space surrounding each of the four bundles of catalyst tubes is preferably in each case provided with a dedicated inlet and outlet for the heat transfer medium.

In a further preferred embodiment, the flow paths of the heat transfer medium in each reactor cross section, in each case measured from the first catalyst tube to the last catalyst tube in the flow direction of the heat transfer medium, are further matched to one another by installation of dummy tubes.

It has been found that the segmentation of the bundle of catalyst tubes into two or four identical regions which are separated by regions which are free of deflection plates and through which the heat transfer medium can therefore circulate largely unhindered makes it possible to achieve a further improvement in the flow of the heat transfer medium onto the catalyst tubes and thus a further equalization of the heat transfer coefficient $\alpha$ over each reactor cross section. This enables phosgene reactors having even larger diameters and an even higher phosgene loading to be operated without problems and without the catalyst tubes corroding.

For the flow of the heat transfer medium in the outer space of the reactor between two deflection plates, within a reactor cross section, from one tube-free region (opening) to the opposite tube-free region, in each case at the interior wall of the reactor, the pressure drop is the same for all flow paths of the heat transfer medium.

The pressure drop $\Delta p$ can be described by the following equation:

$$\Delta p = l/d_R (\zeta_1 \cdot \eta \cdot v + \zeta_2 \cdot \rho/2 v^2),$$

where $\Delta p$ is the pressure drop in pascal, $\zeta_1$ and $\zeta_2$ are the dimensionless pressure drop coefficients, l is the length of the flow path in m, $d_R$ is the diameter of a catalyst tube (characteristic parameter) in m, $\rho$ is the density in kg/m$^3$, v is the velocity in m/s and $\eta$ is the viscosity in Pa·s.

In the above formula, the first term corresponds to a laminar component of the pressure drop which is proportional to the viscosity and the second term corresponds to a turbulent component which is proportional to the square of the velocity.

Since the pressure drop is the same for every flow path, the velocity of the heat transfer medium is, according to the above formula for the pressure drop, correspondingly greater for shorter flow paths as occur in the middle of the tube plane of a reactor according to the prior art with mutually opposite boundaries of the bundle of catalyst tubes in the form of chords of a circle compared to flow paths at the interior wall of the reactor, under otherwise unchanged conditions, in particular the same distribution of tubes. Since the heat transfer coefficient $\alpha$ is approximately directly proportional to the velocity to the power of 0.8, lower flow velocities of the heat transfer medium and accordingly lower heat transfer coefficients, i.e. poorer heat transfer, are obtained for the longer flow paths at the interior wall of the reactor compared to the shorter flow paths in the middle of the reactor.

The reactor according to the invention is cylindrical and has an internal diameter of preferably from 0.5 to 8 m, more preferably from 2.5 to 6 m, in particular from 3.5 to 6 m.

A bundle, i.e. a plurality, of catalyst tubes arranged parallel to one another in the longitudinal direction of the reactor is present in the reactor.

The number of catalyst tubes is preferably in the range from 100 to 10 000, in particular from 2000 to 6000.

The catalyst tubes are made of a corrosion-resistant material, for example stainless steel, preferably duplex steel 1.4462, stainless steel 1.4571 or stainless steel 1.4541 or nickel-based alloys or nickel. The tube plates or the entire reactor are preferably also made of the abovementioned materials, in particular duplex or stainless steel.

Each catalyst tube preferably has a wall thickness in the range from 2.0 to 4.0 mm, in particular from 2.5 to 3.0 mm, and internal tube diameter in the range from 20 to 90 mm, preferably in the range from 30 to 50 mm.

The catalyst tubes preferably have a length in the range from 1.5 to 6.0 m, in particular in the range from 2.5 to 4.5 m.

The catalyst tubes are preferably arranged in the interior of the reactor so that the ratio of the distance of the midpoints of directly adjacent catalyst tubes to the external diameter of the catalyst tubes is in the range from 1.15 to 1.4, preferably in the range from 1.2 to 1.3, and the catalyst tubes are arranged in a triangular arrangement in the reactor.

The catalyst tubes are fixed, preferably welded, in a liquid-tight manner in tube plates at the two ends. The tube plates likewise comprise a corrosion-resistant material, preferably stainless steel, in particular duplex steel, particularly preferably the same material as the catalyst tubes.

Both ends of the reactor are bounded on the outside by caps. The reaction mixture is fed into the catalyst tubes through one cap, and the product stream is taken off via the cap at the other end of the reactor.

Gas distributors for equalizing the gas flow, for example in the form of a plate, in particular a perforated plate, are preferably arranged in the caps.

Deflection plates are arranged perpendicular to the longitudinal direction of the reactor in the intermediate space between the catalyst tubes.

The deflection plates are configured so that each deflection plate has two cutouts which are located opposite one another and have the shape of a segment of a circle and the next deflection plate has an opening in a central region of the reactor bounded by two straight lines which are parallel to one another and to a reactor diameter and are equidistant from the reactor diameter.

In a preferred embodiment, the deflection plates have two central openings.

The deflection plates effect deflection of the heat transfer medium circulating in the intermediate space between the catalyst tubes in the interior of the reactor so that the heat transfer medium flows transversely against the catalyst tubes, as a result of which heat removal is improved.

The number of deflection plates is preferably from about 6 to 21.

The deflection plates are preferably equidistant from one another, but particular preference is given to the lowermost and the uppermost deflection plate each being further from the tube plate than the distance between two successive deflection plates, preferably by a factor of about 1.5.

The reactor is without tubes in the region of the openings, i.e. it is essentially free of catalyst tubes in this region. In one embodiment, individual catalyst tubes can be arranged in the openings in the deflection regions.

In a further embodiment, the openings are completely free of catalyst tubes.

It is preferred that all deflection plates leave the same openings free.

The area of each opening is preferably from 5 to 20%, in particular from 8 to 14%, of the reactor cross section.

The total area of the central tube-free region or the sum of the areas of the two central tube-free regions located perpendicular to one another in a reactor cross section is preferably such that the axial flow velocity of the heat transfer medium through the one or two central tube-free region(s) is from about 0.25 to 2.0 m/s, preferably from about 0.5 to 1.5 m/s.

The deflection plates preferably do not form a seal around the catalyst tubes but allow a leakage flow of up to 40% by volume of the total flow of the heat transfer medium.

For this purpose, gaps in the range from 0.1 to 0.6 mm, preferably from 0.2 to 0.4 mm, are provided between the catalyst tubes and deflection plates.

It is advantageous to make the deflection plates liquid-tight against the interior wall of the reactor with the exception of the regions of the openings, so that no additional leakage flow occurs at the interior wall.

The deflection plates are preferably made of a corrosion-resistant material, preferably stainless steel, in particular duplex steel, preferably in a thickness of from 8 to 30 mm, preferably from 10 to 20 mm. The material of the deflection plates should be electrochemically compatible with the material of the catalyst tubes.

The catalyst tubes are filled with a solid-state catalyst, preferably activated carbon. The catalyst bed in the catalyst tubes preferably has a void volume of 0.33 to 0.5, in particular from 0.33 to 0.40.

According to the invention, proceeding from the above-described arrangement of the catalyst tubes as described in the document WO 03/072237, the arrangement of the catalyst tubes is modified by altering the lateral boundaries of the bundle of catalyst tubes in the tube plane from chords of a circle to circular arcs. In this way, the number of catalyst tubes on the longest flow path of the heat transfer medium is, compared to a reactor according to the prior art, reduced to the greatest extent at the interior wall of the reactor and is correspondingly increased in the middle of the reactor. It is not necessary for the lateral boundaries of the bundle of catalyst tubes in the arrangement according to the invention of the catalyst tubes to correspond precisely to a circular arc shape, it is merely preferred that they approximate a circular arc shape.

In particular, the lateral boundaries of the bundle of catalyst tubes can be changed in each case to a polygonal line which is in each case inscribed within a circular arc.

In a further embodiment, the heat transfer coefficients at the interface between the catalyst tubes and the heat transfer medium can be matched to one another by installing dummy tubes in the regions having the poorest heat transfer, i.e. in the regions close to the interior wall of the reactor which have the longest flow paths of the heat transfer medium or by taking catalyst tubes out of this region. Furthermore, it is also possible to close catalyst tubes in the regions which have relatively poor heat transfer coefficients and at which there is a risk of corrosion.

In a further embodiment, it is possible to provide flow-disturbing internals, for example perforated plates, in the inner region of the reactor where the flow paths of the heat transfer medium are shortest and the heat transfer coefficients are therefore greatest, in order to achieve further equalization of the heat transfer coefficients over the entire reactor cross section.

In particular, the change in the arrangement of the catalyst tubes for the purpose of equalizing the flow paths of the heat transfer medium in each reactor cross section can be effected according to the following algorithm:

the tube plane, i.e. the arrangement of the catalyst tubes in a reactor cross section is firstly drawn, with the two opposite lateral boundaries of the bundle of catalyst tubes in the plane being chords of a circle and the main flow direction of the heat transfer medium in the tube plane being designated as the y coordinate and the coordinate at right angles thereto in the plane of the reactor cross section being designated as the x coordinate;

the tube plane is subsequently divided into n straight lines which are parallel to the chords of the circle and are equidistant from one another;

each of the n straight lines is divided into m equidistant points which are numbered consequently with a natural number i, where i=1 to m and the outermost points, i.e. the points i=1 and the points i=m, are each located on the outer margin of the tube plane, i.e. at the wall of the reactor;

the i-th points on the straight lines are in each case joined to one another to give flow paths whose lengths are matched by means of the following iteration steps:

(1) determine the longest flow path $i_{max}$ and shortest flow path $i_m$; if more than one longest or shortest flow path exists, make a random choice, (2) determine the difference of the lengths of the flow paths of the shortest and longest flow path, i.e. the inequality of the flow path lengths; if the inequality of the flow path lengths is less than 1% of the mean of the lengths of the flow paths, go to (8);

(3) shorten the longest flow path $i_{max}$ by 25% of the inequality by uniformly reducing the y coordinate of the two outermost points, i.e. the point on the first and the point on the n-th straight line on this flow path and subsequently equidistantly redistributing the points located in between;

(4) the shortest flow path is analogously extended so that the area of the tube plane, i.e. the area bounded by the two chords of a circle and the shell of the reactor, does not change compared to the previous iteration;

(5) in the case of flow paths which are not the outermost flow paths i=1 and i=m, the x coordinates are not changed during this change in the y coordinates of the points;

(6) in the case of one of the two outer curves, the x coordinate is changed in such a way that the points continue to be on the reactor shell; if it is necessary to move a point in the x direction, all points on the line i=n are moved so that they are again equidistant from one another;

(7) go back to (1);

(8) end of the iteration.

In the above algorithm, only the main flow direction of the heat transfer medium in the plane of the reactor cross section, which is here designated as y coordinate, between the openings opposite one another on the interior wall of the reactor is considered. This simplified view is generally sufficient as a basis for determining an altered arrangement of the catalyst tubes.

However, if the flow paths of the heat transfer medium are looked at more precisely, the flow direction perpendicular to the above flow direction in the plane of the reactor cross section has to be taken into account and is here designated as x coordinate.

If only the main flow direction along the y coordinate over the reactor cross section is taken into account, the arrangement of the catalyst tubes has to be altered in such a way that the flow paths in each reactor cross section from the first to last catalyst tube are in each case identical.

However, since the flow of the heat transfer medium along the x coordinate is advantageously also taken into account, to equalize the flow in the x direction, too, the arrangement of the catalyst tubes should be adapted so that the flow paths of the heat transfer medium at the interior wall of the reactor are up to 25% shorter than along the central axis.

As a result of the flow paths being shortened overall compared to a reactor according to the prior art, corresponding to WO 03/072237, by means of the arrangement of the catalyst tubes according to the invention, the pressure drop of the heat transfer medium is lower overall at the same velocity of the heat transfer medium. Correspondingly, the bypass flow of the heat transfer medium through the gaps between the deflection plates and the catalyst tubes is also lower and the amounts of heat transfer medium which have to be circulated are lower.

The invention also provides a reactor for preparing phosgene by gas-phase reaction of carbon monoxide and chlorine in the presence of a solid-state catalyst, in a reactor which comprises the solid-state catalyst in a plurality of catalyst tubes which are arranged parallel to one another in the longitudinal direction of the reactor and are welded at each of their two ends into a tube plate, with introduction of the starting materials at the upper end of the catalyst tubes and discharge of the gaseous reaction mixture at the lower end of the catalyst tubes, in each case via a cap, and also with introduction and discharge facilities for a liquid heat transfer medium in the space between the catalyst tubes within the shell, where the flow of the heat transfer medium in the space between the catalyst tubes within the shell is meandering as a result of deflection plates, each alternative deflection plate leaves two openings having the shape of a segment of a circle free on opposite sides at the interior wall of the reactor and the immediately subsequent deflection plate leaves a central opening which is bounded by two straight lines which are parallel to and equidistant from one another and a reactor diameter free and the reactor has no tubes in the region of the openings having the shape of a segment of a circle and in the region of the central openings, wherein the many catalyst tubes aligned parallel to one another in the longitudinal direction of the reactor are arranged in two bundles of identical catalyst tubes which are separated from one another by a region which is free of catalyst tubes and the heat transfer coefficients at the interface between the catalyst tubes and the heat transfer medium are equalized over each reactor cross section by the flow paths of the heat transfer medium in each reactor cross section, in each case measured from the first to last catalyst tube in the flow direction of the heat transfer medium, being matched to one another by means of an altered arrangement of the catalyst tubes.

Preference is given to a process in which the two bundles of identical catalyst tubes are each divided into two further bundles of identical catalyst tubes, so that there are a total of four bundles of catalyst tubes which are separated from one another by two regions which are free of catalyst tubes and extend on both sides of mutually perpendicular diameters of the reactor.

The flow paths of the heat transfer medium in each reactor cross section, in each case measured from the first catalyst tube to the last catalyst tube in the flow direction of the heat transfer medium, can preferably be further matched to one another by installation of dummy tubes.

As a result of the configuration according to the invention of the reactor, with division of the catalyst tubes into two or four bundles, the flow paths along the interior wall of the reactor become equal to or up to 15% smaller than those along the central axis of the reactor due to the altered arrangement of the catalyst tubes with the chords of a circle in the tube plane being changed to circular arcs.

The arrangement according to the invention of the catalyst tubes enables the deviations between the heat transfer coefficients $\alpha$ within each reactor cross section to be reduced from an original value of from about 13 to 20% in the case of a reactor according to the prior art, corresponding to the publication WO 03/072237, to differences of only from 8 to 10%.

The invention is illustrated below with the aid of examples and a drawing.

EXAMPLES

Figure 1:
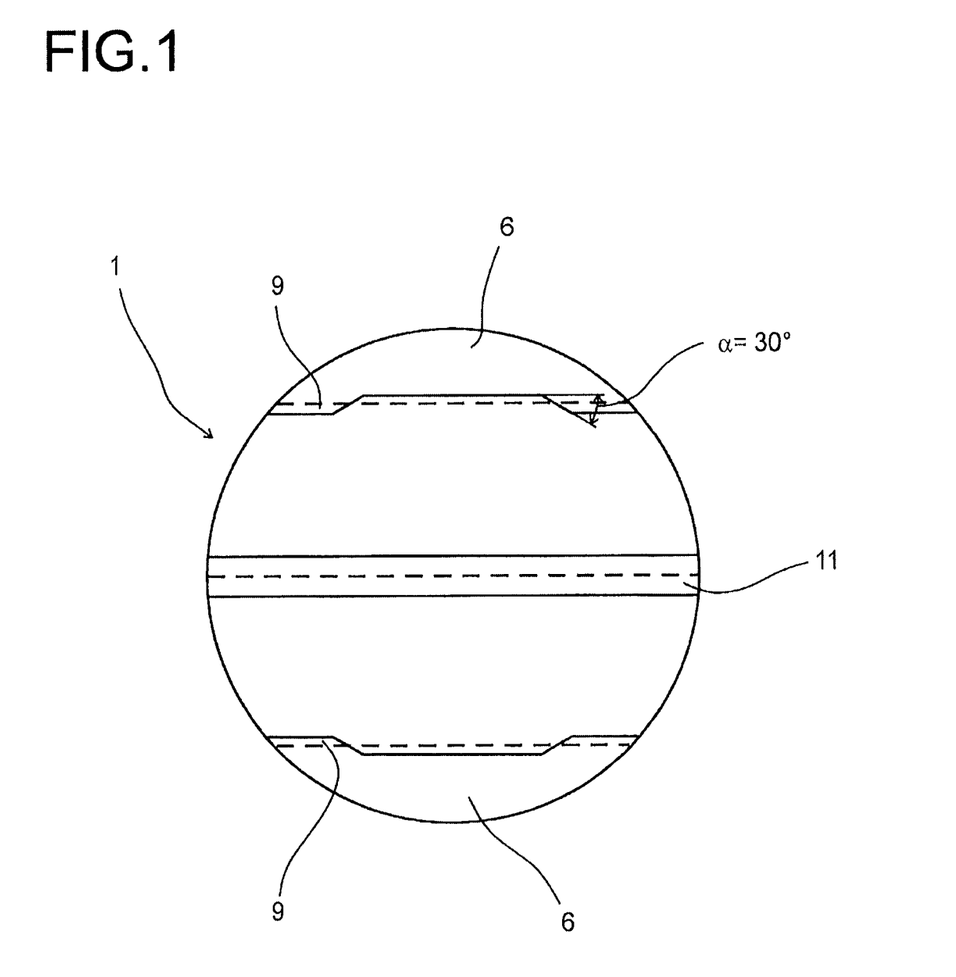
FIG. 1 a cross section through an embodiment of a reactor according to the invention with adapted arrangement of the catalyst tubes, with the longitudinal section through the reactor being depicted in FIG. 1A, and FIG. 2 a section through an embodiment of a reactor according to the invention with cross section in the plane B-B in FIG. 2A.
Figure 1A:
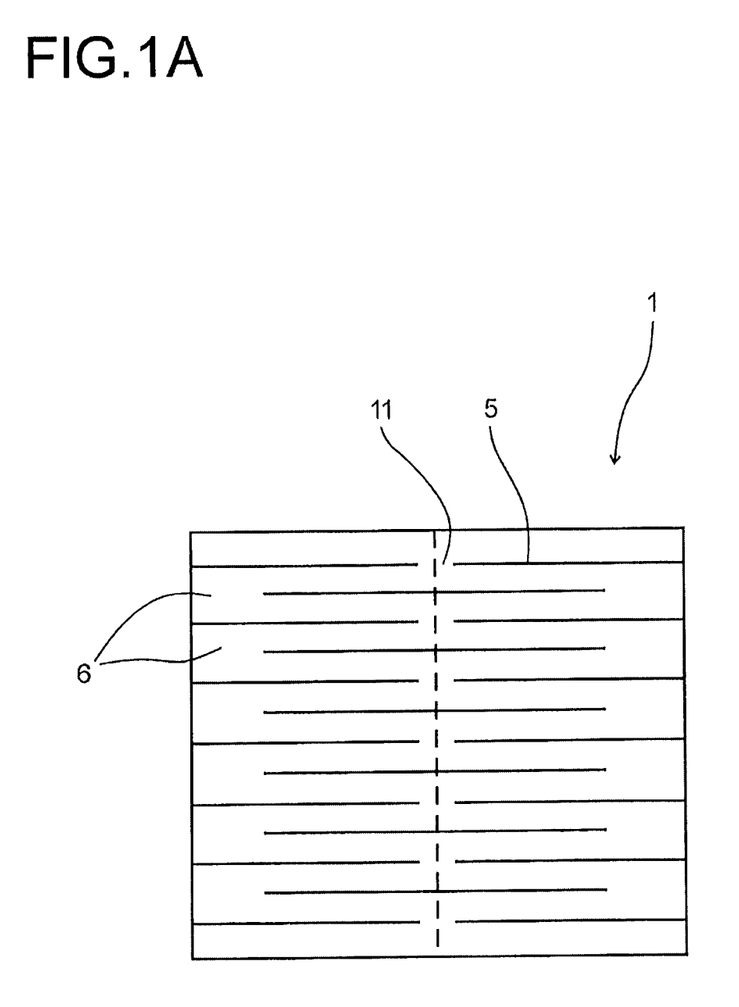

Phosgene was prepared in an industrial reactor as shown schematically in FIGS. 1 and 1A in which the catalyst tubes were arranged, in an example according to the prior art, so that the tube plane had two boundaries in the form of chords of a circle located opposite one another or, according to the invention, the arrangement of the catalyst tubes in the tube plane was altered so that the lateral boundaries opposite one another were changed from chords of a circle into polygonal lines and, in addition, a central region of the reactor was left free of catalyst tubes and deflection plates.

In the case of the reactor according to the invention having two bundles of catalyst tubes, two inlets and two outlets for the heat transfer medium monochlorobenzene are required. The reaction mixture is conveyed from the top downward through the vertical catalyst tubes and the heat transfer medium monochlorobenzene can be conveyed in cocurrent thereto, i.e. with introduction in the upper region of the reactor and discharge in the lower region of the reactor and meandering flow through the space within the shell around the catalyst tubes, or in countercurrent to the reaction mixture with introduction in the lower region of the reactor, meandering flow through the space within the shell around the catalyst tubes and discharge in the upper region of the reactor.

5210 catalyst tubes each having an external tube diameter of 44.5 mm, a wall thickness of 2.6 mm, a tube length of 3800 mm and a spacing of 55 mm were in each case arranged in the reactor, with the catalyst tubes being in each case arranged at the corners of equilateral triangles.

14 deflection plates were arranged in the reactor

The reaction mixture, viz. carbon monoxide and chlorine, was passed over an activated carbon catalyst in the catalyst tubes. Monochlorobenzene was passed as heat transfer medium through the space within the shell between the catalyst tubes at a coolant flow rate of 3500 t/h, an inlet temperature of the monochlorobenzene of 67° C. and an outlet temperature of the monochlorobenzene of 78° C. for the example according to the prior art and for the first example according to the invention with the same phosgene loading as that according to the prior art or 81° C. for the second example with an increased phosgene loading.

Carbon monoxide was used in an excess of 3.5% by weight, based on the total weight of the reaction mixture. The inlet temperature of the reaction mixture was 40° C., the inlet pressure was 4.8 bar absolute and the phosgene feed rate was 48 t/h for the example according to the prior art and the first example according to the invention or 62.4 t/h for the second example according to the invention.

In the case of the comparative example, a worst heat transfer coefficient α of 1290 W/m²/K was achieved at an unadapted arrangement of the catalyst tubes, i.e. with a tube plane having two opposite boundaries in the form of chords of a circle. At a phosgene loading of 2.11 kg of phosgene/m²/s, this led to a maximum temperature of the interior wall of the catalyst tubes of 154° C.

As a result of the adapted arrangement of the catalyst tubes according to the invention, i.e. with the tube plane being changed from two opposite lateral boundaries in the form of chords of a circle to in each case a polygonal line and additionally leaving a central region free of tubes, in each case with the dimensions corresponding to the figures in the cross section depicted in FIG. 1, the worst heat transfer coefficient α could be increased to 1537 W/m²/K under otherwise unchanged conditions. The maximum temperature of the interior wall of the catalyst tubes was only 147° C. as a result.

The phosgene loading was therefore increased in a second example according to the invention until a maximum temperature of the interior wall of the catalyst tubes of 154° C., as in the case of the reactor according to the prior art, was reached. This maximum temperature of the interior wall of the catalyst tubes of 154° C. was reached in the case of a phosgene reactor according to the invention at a phosgene loading of 2.74 kg of phosgene/m²/s, corresponding to a capacity increase by 30% compared to the reactor according to the prior art.

The cross section through a reactor 1 in FIG. 1 shows a tube plane for an embodiment of a reactor according to the invention, with the lateral boundaries of the tube plane at the openings 6 opposite one another at the interior wall of the reactor being changed from chords of a circle to polygonal lines. In addition, a central opening 11 which is bounded by two straight lines which run parallel and at an equal distance from the two sides of a reactor diameter running parallel to the chords 9 which bound the tube plane according to the prior art and is likewise free of tubes is provided in the central region of the reactor.

The longitudinal section through a reactor 1 depicted in FIG. 1A shows the arrangement of the deflection plates 5 with openings 6 at the interior wall of the reactor and central opening 11.

Figure 2:
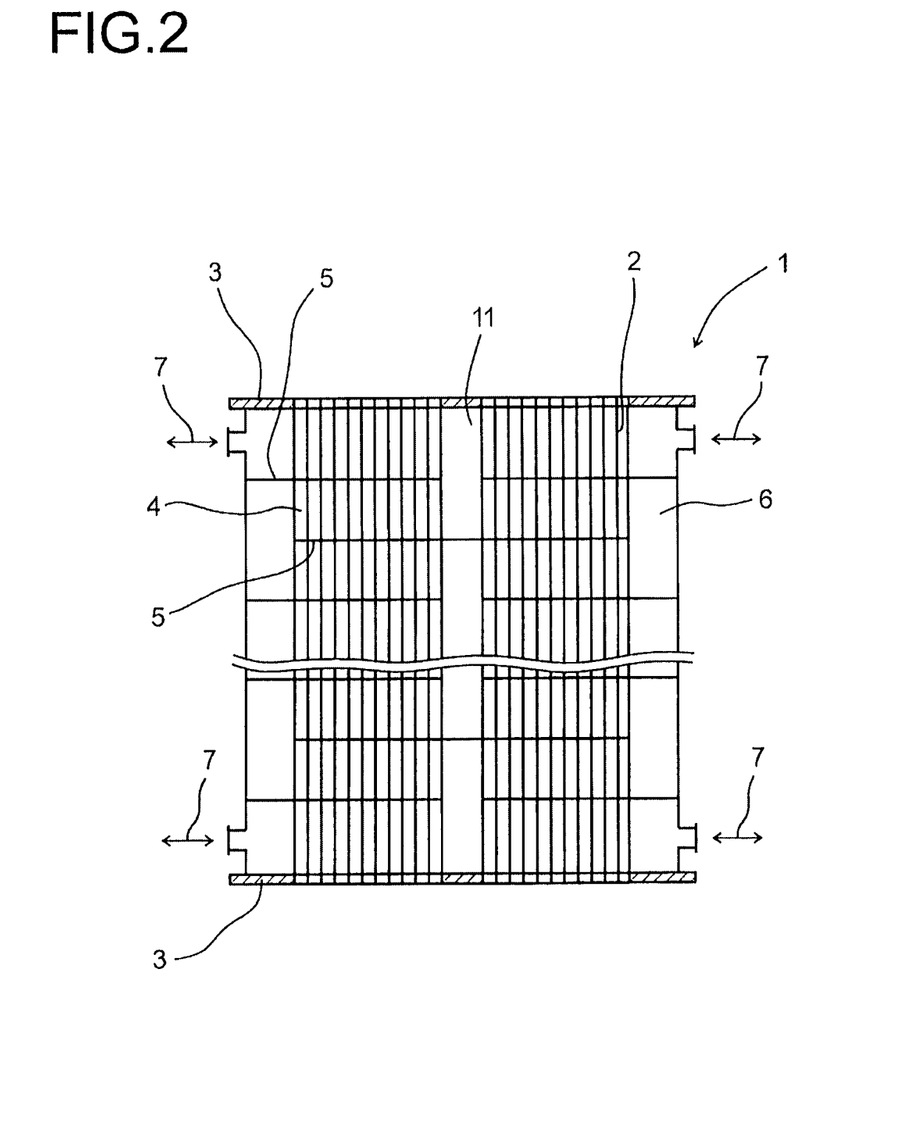

FIG. 2 shows a longitudinal section through an embodiment of a reactor 1 according to the invention, with two bundles of parallel catalyst tubes 2 which are welded at each of their two ends into a tube plate 3. A heat transfer medium 7 flows through the space within the shell around the catalyst tubes 2, with two inlets and two outlets being provided for the heat transfer medium 7. The heat transfer medium 7 can be conveyed either in cocurrent to the reaction mixture passed from the top downward through the catalyst tubes, i.e. with introduction in the upper region and discharge in the lower region of the reactor, or, conversely, in countercurrent to the reaction mixture with introduction in the lower region of the reactor and discharge in the upper region of the reactor.

The flow of the heat transfer medium through the space within the shell is directed by deflection plates 5 which leave openings 6 having the shape of segments of a circle at the interior wall of the reactor and a central opening 11 free.

Figure 2A:
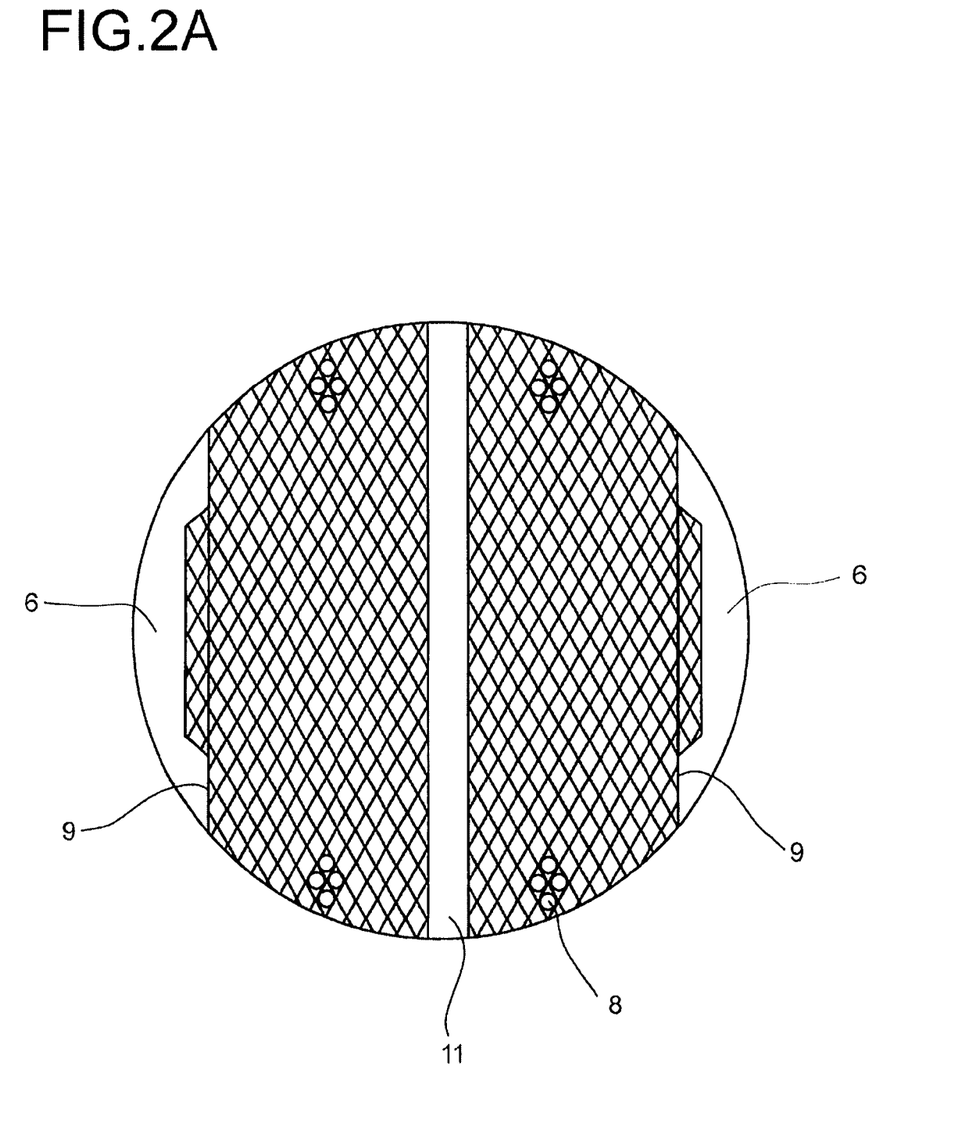

In the cross-sectional depiction of the plane B-B in FIG. 2A, it is possible to see the altered arrangement of the catalyst tubes in the region of the opening 6 having the shape of a segment of a circle and the absence of catalyst tubes in the central opening 11. In addition, dummy tubes 8 are provided in the regions which are at most risk of corrosion.

The invention claimed is:

1. A cylindrical reactor, comprising:
a) a plurality of catalyst tubes which are arranged parallel to one another in the longitudinal direction of the reactor and are welded at each of their two ends into a tube plate to form at least two bundles of identical catalyst tubes;
b) at least two caps, wherein starting materials are introduced through a first cap at an upper end of the catalyst tubes and gaseous reaction mixture is discharged through a second cap at a lower end of the catalyst tubes;
c) at least one introduction facility and at least one discharge facility for a liquid heat transfer medium in the space between the catalyst tubes;
d) at least two deflection plates comprising at least one alternative deflection plate and at least one immediately subsequent deflection plate;
e) at least one central opening; and
f) at least two other openings;
wherein:
the flow of the liquid heat transfer medium in spaces between the catalyst tubes meanders as a result of the deflection plates,
each alternative deflection plate has lateral boundaries each in a shape of a segment of a circle, leaving the other openings free on opposite sides at the interior wall of the reactor,
lateral boundaries of the bundles of identical catalyst tubes take the form of circular arcs on a plane of the tube plate,
the at least one immediately subsequent deflection plate leaves the central opening which is bounded by two straight lines which are parallel to and equidistant from one another and a free surface of the reactor,
the reactor has no catalyst tubes in the region of the other openings and in the region of the at least one central opening,
the bundles of identical catalyst tubes are separated from one another by a region which is free of catalyst tubes and extends to both sides along a reactor diameter,
a plurality of heat transfer coefficients at interfaces between the catalyst tubes and the liquid heat transfer medium are equalized over each of a plurality of reactor cross sections by matching to one another a plurality of flow paths of the liquid heat transfer medium in each of the plurality of reactor cross sections,
in each case the plurality of flow paths of the liquid heat transfer medium are measured from a first catalyst tube to a last catalyst tube in the flow direction of the liquid heat transfer medium,
the plurality of flow paths are matched to one another by means of an altered arrangement of the catalyst tubes by altering a plurality of lateral boundaries of the bundles of identical catalyst tubes from at least one chord of a circle to at least one circular arc in the plane of the tube plate.

2. The reactor according to claim 1, wherein:
the bundles of identical catalyst tubes are each divided into at least two further bundles of identical catalyst tubes, so that there are a total of at least four bundles of identical catalyst tubes, and
the at least four bundles of identical catalyst tubes are separated from one another by at least two regions which are free of catalyst tubes and extend on both sides of mutually perpendicular diameters of the reactor.

3. The reactor according to claim 1, wherein the plurality of flow paths of the liquid heat transfer medium in each of the plurality of reactor cross sections are further matched to one another by installation of at least one dummy tube.

4. A process for preparing phosgene with the reactor of claim 1, comprising:
a) introducing the starting materials at the upper end of the catalyst tubes through the first cap;
b) introducing the liquid heat transfer medium into the space between the catalyst tubes from the at least one introduction facility;
c) meandering the flow of the liquid heat transfer medium in the space between the catalyst tubes as a result of the deflection plates;
d) equalizing the heat transfer coefficients at the interfaces between the catalyst tubes and the liquid heat transfer medium over each of the plurality of reactor cross sections by matching to one another the plurality of flow paths of the liquid heat transfer medium in each of the plurality of reactor cross sections;
e) discharging the liquid heat transfer medium through the at least one discharge facility; and
f) discharging the gaseous reaction mixture at the lower end of the catalyst tubes through the second cap.

5. The process according to claim 4, wherein:
the bundles of identical catalyst tubes are each divided into at least two further bundles of identical catalyst tubes, so that there are a total of at least four bundles of identical catalyst tubes, and
the at least four bundles of identical catalyst tubes are separated from one another by at least two regions which are free of catalyst tubes and extend on both sides of mutually perpendicular diameters of the reactor.

6. The process according to claim 4, wherein the plurality of flow paths of the liquid heat transfer medium in each of the plurality of reactor cross sections are further matched to one another by installation of at least one dummy tube.

7. A cylindrical reactor, comprising:
a) a plurality of catalyst tubes which are arranged parallel to one another in the longitudinal direction of the reactor and are welded at each of their two ends into a tube plate to form at least two bundles of identical catalyst tubes;
b) at least two caps, wherein starting materials are introduced through a first cap at an upper end of the catalyst tubes and gaseous reaction mixture is discharged through a second cap at a lower end of the catalyst tubes;
c) at least one introduction facility and at least one discharge facility for a liquid heat transfer medium in the space between the catalyst tubes;
d) at least two deflection plates comprising at least one alternative deflection plate and at least one immediately subsequent deflection plate;
e) at least one central opening; and
f) at least two other openings;
wherein:
the flow of the liquid heat transfer medium in spaces between the catalyst tubes meanders as a result of the deflection plates,
each alternative deflection plate has lateral boundaries each in a shape of a polygonal line, leaving the other openings free on opposite sides at the interior wall of the reactor,
lateral boundaries of the bundles of identical catalyst tubes take the form of circular arcs on a plane of the tube plate,
the at least one immediately subsequent deflection plate leaves the central opening which is bounded by two straight lines which are parallel to and equidistant from one another and a free surface of the reactor,
the reactor has no catalyst tubes in the region of the other openings and in the region of the at least one central opening,
the bundles of identical catalyst tubes are separated from one another by a region which is free of catalyst tubes and extends to both sides along a reactor diameter,
a plurality of heat transfer coefficients at interfaces between the catalyst tubes and the liquid heat transfer medium are equalized over each of a plurality of reactor cross sections by matching to one another a plurality of flow paths of the liquid heat transfer medium in each of the plurality of reactor cross sections,
in each case the plurality of flow paths of the liquid heat transfer medium are measured from a first catalyst tube to a last catalyst tube in the flow direction of the liquid heat transfer medium,
the plurality of flow paths are matched to one another by means of an altered arrangement of the catalyst tubes by altering a plurality of lateral boundaries of the bundles of identical catalyst tubes from at least one chord of a circle to at least one circular arc in the plane of the tube plate.

* * * * *